US007139561B2

(12) United States Patent
Ikeda et al.

(10) Patent No.: US 7,139,561 B2
(45) Date of Patent: Nov. 21, 2006

(54) MOBILE COMMUNICATION SYSTEM AND DISTRIBUTED BROADCAST INFORMATION CONTROL METHOD IN MOBILE COMMUNICATION SYSTEM

(75) Inventors: Takehiro Ikeda, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 547 days.

(21) Appl. No.: 10/054,734

(22) Filed: Nov. 13, 2001

(65) Prior Publication Data

US 2002/0164982 A1 Nov. 7, 2002

(30) Foreign Application Priority Data

Nov. 13, 2000 (JP) ............................. 2000-345785

(51) Int. Cl.
*H04M 3/00* (2006.01)
(52) U.S. Cl. ................ 455/420; 455/418; 455/419; 455/432.1; 455/456.1; 455/456.2
(58) Field of Classification Search ................ 455/561, 455/432, 433, 404.1, 456.2, 418, 419, 420, 455/432.1, 456.1, 422.1
See application file for complete search history.

(56) References Cited

U.S. PATENT DOCUMENTS

| 5,724,665 A | | 3/1998 | Abbasi et al. ............... 455/561 |
| 5,842,128 A | * | 11/1998 | Kito et al. ................ 455/435.1 |
| 6,181,944 B1 | * | 1/2001 | Uebayashi et al. ....... 455/456.2 |
| 6,463,273 B1 | * | 10/2002 | Day ........................ 455/404.1 |
| 6,519,248 B1 | * | 2/2003 | Valko ........................ 455/433 |

FOREIGN PATENT DOCUMENTS

| EP | 0700173 A2 | 3/1996 |
| EP | 0944275 A2 | 9/1999 |
| EP | 1045562 A2 | 10/2000 |
| GB | 2319439 A | 5/1998 |
| JP | 03-250821 | 11/1991 |
| JP | 04-140937 | 5/1992 |
| JP | 08-237728 | 9/1996 |
| JP | 10-126841 | 5/1998 |
| JP | 11-215552 | 8/1999 |
| JP | 2001-177866 | 6/2001 |
| JP | 2001-218245 | 8/2001 |
| WO | WO 98/19479 | 5/1998 |

OTHER PUBLICATIONS

Official Notice of Rejection , Patent Application No. 2001-347905 Case No. DCH130418.
Austrian Patent Office Service and Information Sector (TRF) Search Report Application No. 200106864-2.

* cited by examiner

*Primary Examiner*—Joseph Feild
*Assistant Examiner*—Huy D. Nguyen
(74) *Attorney, Agent, or Firm*—Workman Nydegger (57) ABSTRACT

A mobile communication system can implement broadcasting control that generates broadcast information autonomously in a distributed manner, thereby obviating the need for an RNC (Radio Network Controller). Each base station has an IP address and a base station multicast address. Each base station sends its own system information to all base stations using the multicast address. Each base station generates its broadcast information from its own system information and the system information received from other base stations. Thus, it can generate the broadcast information autonomously in a distributed manner without using the RNC.

10 Claims, 10 Drawing Sheets

FIG.1

| | |
|---|---|
| FIG.1A | |
| FIG.1B | |

FIG.1A

| INFORMATION ELEMENTS | INFORMATION LENGTH (BYTES) | REMARKS |
|---|---|---|
| MESSAGE TYPE | 1 | |
| NETWORK NUMBER | 2 | |
| REGULATION INFORMATION | 3 | |
| CONTROL CHANNEL STRUCTURE INFORMATION | 6~33 | RESERVED FOR CONTROL CHANNEL |
| MOBILE STATION TRANSMISSION POWER SPECIFICATION | 1 | |
| WAITING ACCEPTABLE SIGNAL LEVEL | 1 | |
| WAITING DEGRADATION SIGNAL LEVEL | 1 | |
| NUMBER OF MULTIPLEXED LOCATION REGISTRATION AREAS | 1 | |
| LOCATION NUMBER | 1 | |
| ? | ? | |
| LOCATION NUMBER | 1 | |
| MAXIMUM NUMBER OF BROADCAST CHANNEL | 1 | |
| RESERVED FOR VISITED ZONE/SECTOR DECISION | 1 | |
| PERCH CHANNEL No. | 1 | |
| PERCH CHANNEL No. | ? | |
| PERCH CHANNEL No. | 1 | |
| LOCATION REGISTRATION TIMER | 1 | |
| LENGTH OF EXTENSION INFORMATION ELEMENT | 1 | |
| FIRST OPERATOR UNIQUE INFORMATION | 0~5 | RESERVED FOR OPERATOR OPTION |

FIG.1B

| | | |
|---|---|---|
| LENGTH OF EXTENSION STANDARD INFORMATION ELEMENT | 1 | |
| PACKET CHANNEL STRUCTURE INFORMATION | 5 | EXTENSION STANDARD INFORMATION ELEMENT |
| FREQUENCY CODE | 2 | EXTENSION STANDARD INFORMATION ELEMENT |
| SLOT No. | 1 | EXTENSION STANDARD INFORMATION ELEMENT |
| COLOR CODE (1) | 1 | EXTENSION STANDARD INFORMATION ELEMENT |
| SCRAMBLING CODE (1) | 1 | EXTENSION STANDARD INFORMATION ELEMENT |
| CHANNEL REGULATION INFORMATION(1) | 1 | EXTENSION STANDARD INFORMATION ELEMENT |
| ? | ? | |
| FREQUENCY CODE (N) | 2 | EXTENSION STANDARD INFORMATION ELEMENT |
| SLOT NO. (N) | 1 | EXTENSION STANDARD INFORMATION ELEMENT |
| COLOR CODE (N) | 1 | EXTENSION STANDARD INFORMATION ELEMENT |
| SCRAMBLING CODE (N) | 1 | EXTENSION STANDARD INFORMATION ELEMENT |
| CHANNEL REGULATION INFORMATION(N) | 1 | EXTENSION STANDARD INFORMATION ELEMENT |
| TERMINAL AREA CODE | 1 | EXTENSION STANDARD INFORMATION ELEMENT |
| NUMBER OF MULTIPLEXED PACKET CALL AREA CODES | 1 | EXTENSION STANDARD INFORMATION ELEMENT |
| ? | ? | |
| MULTIPLEXED NUMBER OF PACKET CALL AREA CODES | 1 | EXTENSION STANDARD INFORMATION ELEMENT |
| ZONE SERVICE INFORMATION | 3 | EXTENSION STANDARD INFORMATION ELEMENT |
| PACKET WAITING ACCEPTABLE SIGNAL LEVEL DIFFERENCE | 1 | EXTENSION STANDARD INFORMATION ELEMENT |
| PACKET USER REGISTRATION TIMER | 1 | EXTENSION STANDARD INFORMATION ELEMENT |
| SECOND OPERATOR UNIQUE INFORMATION | 0~ | RESERVED FOR OPERATOR OPTION |

MULTICAST PACKET FORMAT

FIG.4A

OPERATING FLOW OF BASE STATION
WHEN RECEIVING MULTICAST PACKET

MULTICAST PACKET FORMAT

| BASE STATION MULTICAST ADDRESS | SOURCE BASE STATION ADDRESS | LATITUDE AND LONGITUDE INFORMATION ABOUT SOURCE BASE STATION | DESIRED VALUE OF PACKET COVERAGE (D DESIRE) |
|---|---|---|---|
| SYSTEM INFORMATION | | | |

BROADCAST INFORMATION ACQUISITION
REQUEST PACKET FORMAT

| BASE STATION MULTICAST ADDRESS | SOURCE MOBILE STATION ADDRESS | BROADCAST INFORMATION ACQUISITION REQUEST COMMAND | HOPPING NUMBER |
|---|---|---|---|

FIG.8A

BROADCAST INFORMATION ACQUISITION
REQUEST PACKET FORMAT

| BASE STATION MULTICAST ADDRESS | SOURCE MOBILE STATION ADDRESS | BROADCAST INFORMATION ACQUISITION REQUEST COMMAND | LATITUDE AND LONGITUDE INFORMATION OF SOURCE MOBILE STATION |
|---|---|---|---|
| DESIRED VALUE OF PACKET COVERAGE (D DESIRE) | | | |

FIG.8B

BROADCAST INFORMATION ACQUISITION
RESPONSE PACKET FORMAT

| DESTINATION MOBILE STATION ADDRESS | SOURCE BASE STATION ADDRESS | BROADCAST INFORMATION ACQUISITION RESPONSE COMMAND | LATITUDE AND LONGITUDE INFORMATION OF SOURCE BASE STATION |
|---|---|---|---|
| BROADCAST INFORMATION | | | |

MOBILE COMMUNICATION SYSTEM AND DISTRIBUTED BROADCAST INFORMATION CONTROL METHOD IN MOBILE COMMUNICATION SYSTEM

This application claims priority under 35 U.S.C. 119 to Patent Application No. 2000-345785 filed Nov. 13, 2000 in Japan, the content of which is incorporated hereinto by reference.

BACKGROUND OF THE INVENTION

1. Field of the Invention

The present invention relates to a mobile communication system and a distributed broadcast information control method in the mobile communication system, which are characterized by the broadcast information control in the mobile communication system that offers communication services from a base station to a mobile station via a radio channel.

2. Description of the Related Art

Figures 1, 1A:
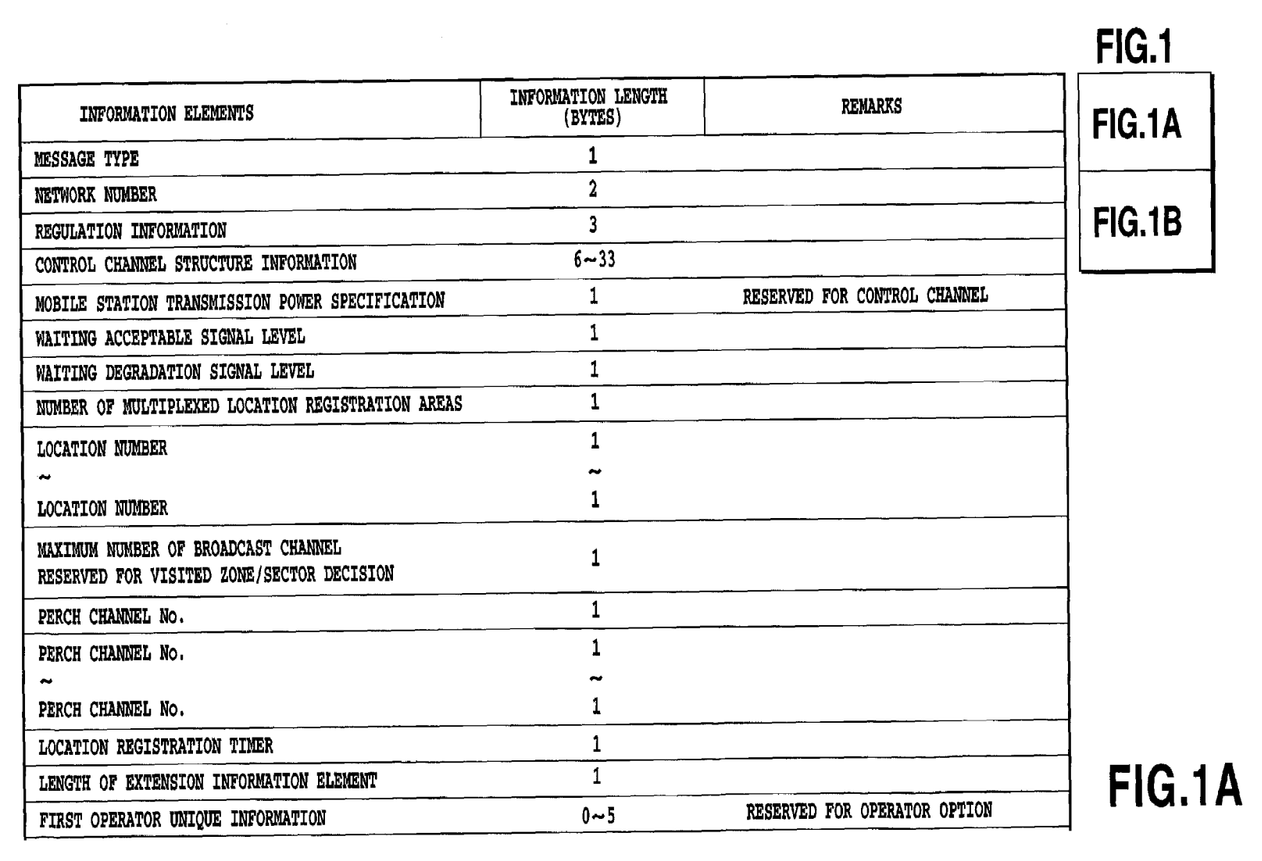
FIG. 1 is a table showing the relationship of FIGS. 1A and 1B.
FIG. 1A is a block table showing an example of the contents of a broadcast information message.
Figure 1B:
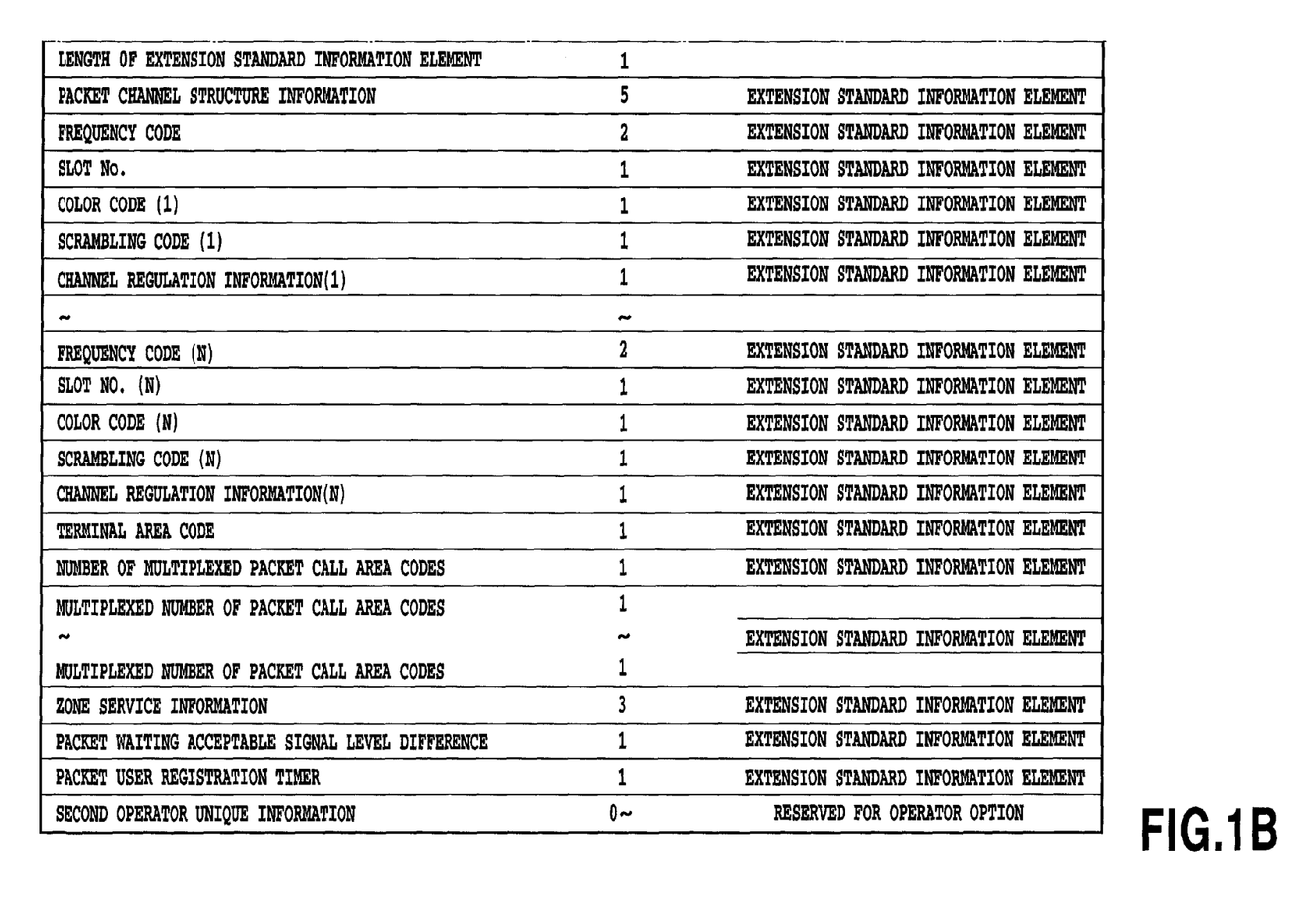
FIG. 1B is a block table showing an example of the contents of a broadcast information message.

In a mobile communication system, a base station periodically transmits various types of broadcast information such as regulation information and available channel information of each area to mobile stations via a broadcasting channel. Receiving such broadcast information, the mobile station can learn the current conditions of the mobile communication system. FIG. 1 shows the contents of a broadcast information message defined in a PDC (Personal Digital Cellular) system, as an example of the broadcast information.

In the broadcasting control in the conventional mobile communication system, an RNC (Radio Network Controller), a higher level control office of the base station that controls multiple base stations, prepares the broadcast information and transmits it to the base stations in a point-to-point manner. Accordingly, the conventional system has a problem in that the load concentrated on the RNC increases with the number of the base stations controlled by the RNC.

SUMMARY OF THE INVENTION

It is therefore an object of the present invention to implement broadcasting control capable of obviating the need of the RNC by preparing the broadcast information autonomously in a distributed manner by interconnecting the base stations two-dimensionally to enable them to exchange information directly.

According to a first aspect of the present invention, there is provided a mobile communication system including multiple base stations that are interconnected two-dimensionally and offer radio communication services in individual service areas, each of the base stations comprising: information exchanging means for exchanging information about broadcast information with other base stations; and broadcast information generating means for generating broadcast information about a broadcasting area of the base station from information about broadcast information that is sent from the other base stations and obtained by the information exchanging means.

Here, the multiple base stations may be interconnected via an IP network.

The information exchanging means of each of the base stations may send its own information about the broadcast information to other base stations using a multicast address.

The information about the broadcast information may include information for controlling coverage of the information about the broadcast information.

The information for controlling the coverage of the information may include a hopping number field value.

The information for controlling the coverage of the information may include latitude and longitude information of a source base station and its desired reception coverage value.

The mobile communication system may further comprise a mobile station that comprises means for acquiring broadcast information about an area other than a broadcasting area the mobile station is visiting, from a base station in the broadcasting area the mobile station is visiting.

According to a second aspect of the present invention, there is provided a distributed broadcast information control method in a mobile communication system including multiple base stations that are interconnected two-dimensionally and offer radio communication services in individual service areas, each of the base stations comprising the steps of: exchanging information about broadcast information with other base stations; and generating broadcast information about a broadcasting area of the base station from information about broadcast information that is sent from the other base stations.

Here, the multiple base stations may be interconnected via an IP network.

Each of the base stations may send its own information about the broadcast information to other base stations using a multicast address when exchanging the information.

The information about the broadcast information may include information for controlling coverage of the information about the broadcast information.

The information for controlling the coverage of the information may include a hopping number field value.

The information for controlling the coverage of the information may include latitude and longitude information of a source base station and its desired reception coverage value.

The distributed broadcast information control method in the mobile communication system may further comprise the step of causing a mobile station to acquire broadcast information about an area other than a broadcasting area the mobile station is visiting, from a base station in the broadcasting area the mobile station is visiting.

According to a third aspect of the present invention, there is provided a base station that offers radio communication services in a service area, the base station comprising: information exchanging means for exchanging information about broadcast information with other base stations; and broadcast information generating means for generating broadcast information about a broadcasting area of the base station from information about broadcast information that is sent from the other base stations and obtained by the information exchanging means.

Here, the information exchanging means may send its own information about the broadcast information to other base stations using a multicast address.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

Figure 9:
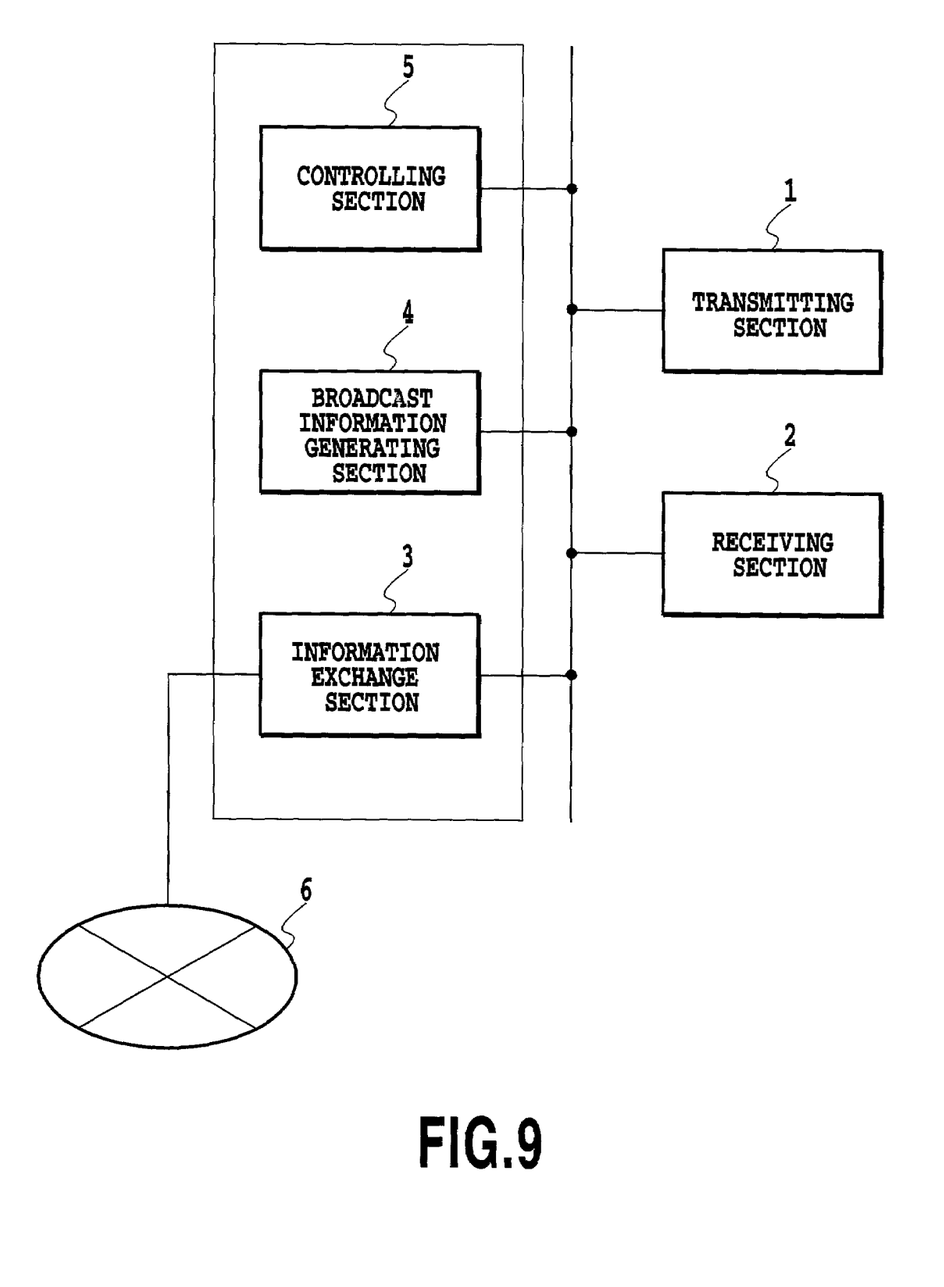
FIG. 9 is a block diagram showing a configuration of a base station used in the embodiments 1–4 of the mobile communication system in accordance with the present invention.

In the following embodiments, a base station is assumed to have a configuration as shown in FIG. 9 as a component constituting the embodiments in accordance with the present invention. Specifically, the base station comprises a transmitting section 1 for transmitting necessary information to a mobile station; a receiving section 2 for receiving a signal transmitted from the mobile station; an information exchanging section 3 for exchanging information about broadcast information with other base stations via an IP (Internet Protocol) network 6; a broadcast information generating section 4 for preparing broadcast information about the broadcasting area the base station belongs to from the information about the broadcast information the information exchanging section 3 collects from the other base stations; and a control section 5 for controlling the transmitting section 1, the receiving section 2, the information exchanging section 3 and the broadcast information generating section 4. The information exchanging section 3, broadcast information generating section 4 and control section 5 can be constructed by a computer system. The computer system implements the functions of the information exchanging section 3, broadcast information generating section 4 and control section 5 by comprising a CPU, a ROM (and a hard disk drive) for storing programs to execute the present invention, a RAM for providing the CPU with a work area, and an interface for accessing the IP network 6, and by executing the programs stored in the ROM (and a hard disk drive) by the CPU. The operations of the following embodiments are executed under the control of the control section 5. On the other hand, the mobile station comprises in its internal memory a program storing area for storing programs to execute data processing that will be described below, and a temporarily storing area of data, and has its internal CPU execute the programs.

(EMBODIMENT 1)

Figure 2:
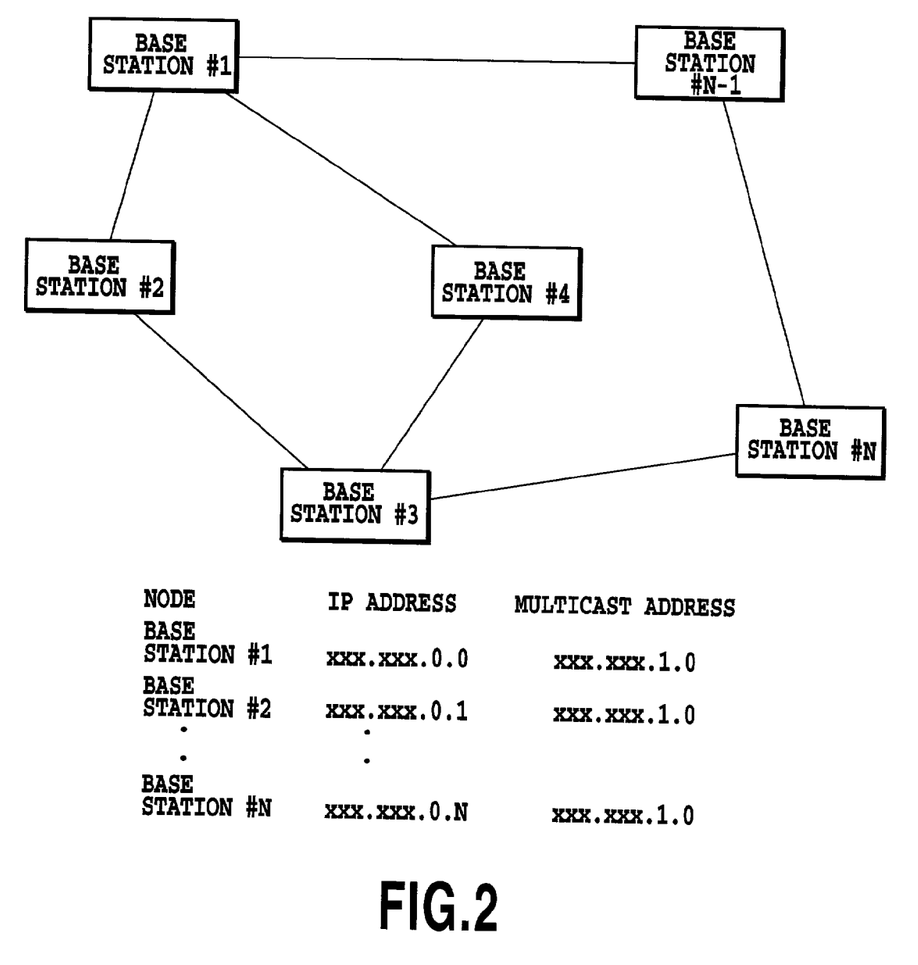
FIG. 2 is a diagram illustrating an embodiment 1 of the mobile communication system in accordance with the present invention.

FIG. 2 is a block diagram showing an embodiment 1 that implements the broadcast information control in accordance with the present invention in the IP network.

In the present embodiment 1, each base station (#1–#N) has an IP address and a base station multicast address as follows.

| Node | IP address | Multicast address |
|---|---|---|
| base station #1 | xxx.xxx.0.0 | xxx.xxx.1.0 |
| base station #2 | xxx.xxx.0.1 | xxx.xxx.1.0 |
| : | : | : |
| base station #N | xxx.xxx.0.N | xxx.xxx.1.0 |

Each base station sends its own system information to all the base stations using the multicast address. Each base station generates its broadcast information from the system information of the other base stations and its own system information.

(EMBODIMENT 2)

Figure 3:
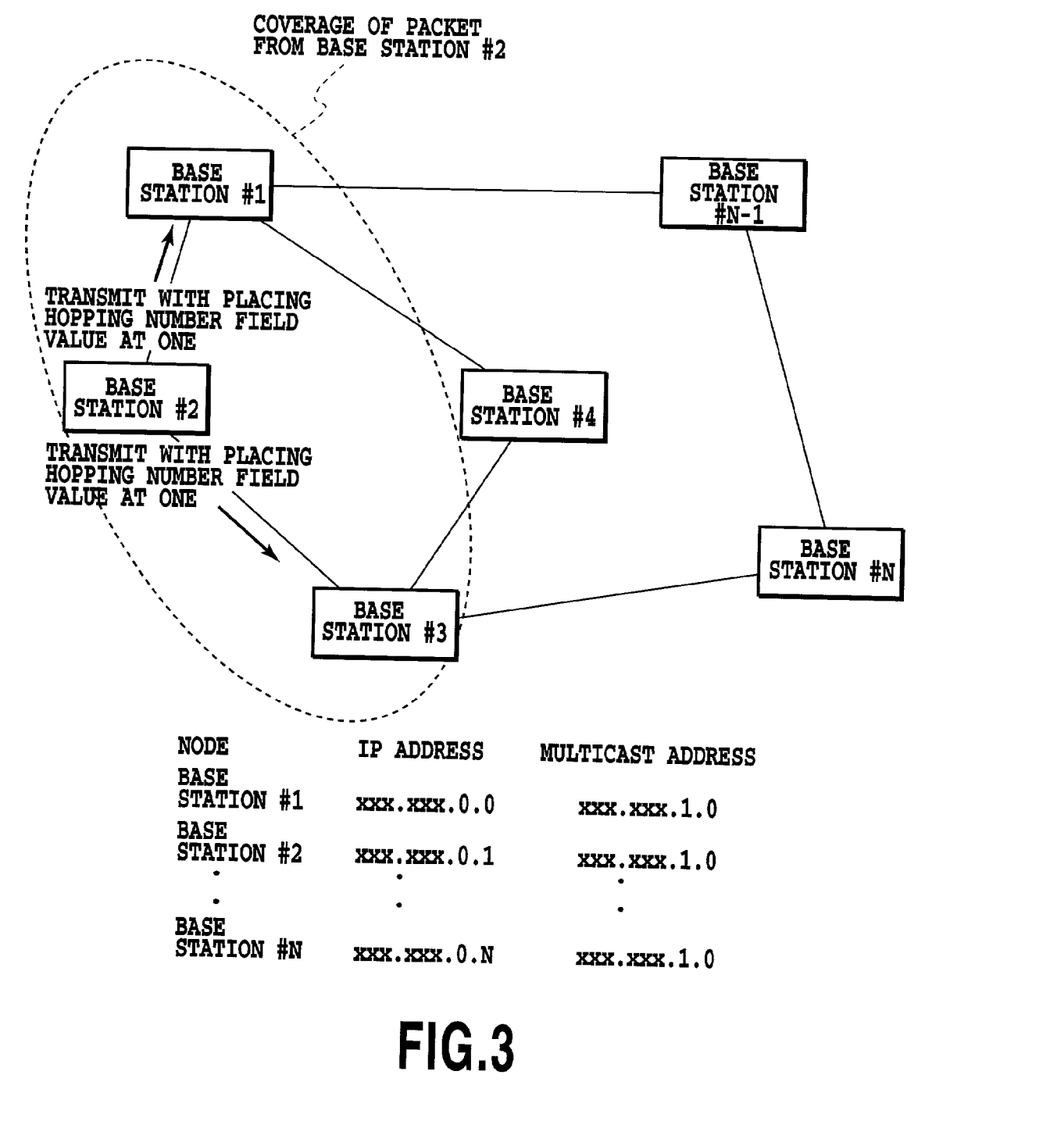
FIG. 3 is a diagram illustrating an embodiment 2 of the mobile communication system in accordance with the present invention.

FIG. 3 is a block diagram showing an embodiment 2 that implements the broadcast information control in accordance with the present invention in the IP network.

In the present embodiment 2, each base station has an IP address and a base station multicast address as in the foregoing embodiment 1.

Each base station sends its own system information using the multicast address. In this case, the transmission packet includes a hopping number field, in which a hopping number field value is set at the transmission to control the coverage of the packet.

Figure 4A:
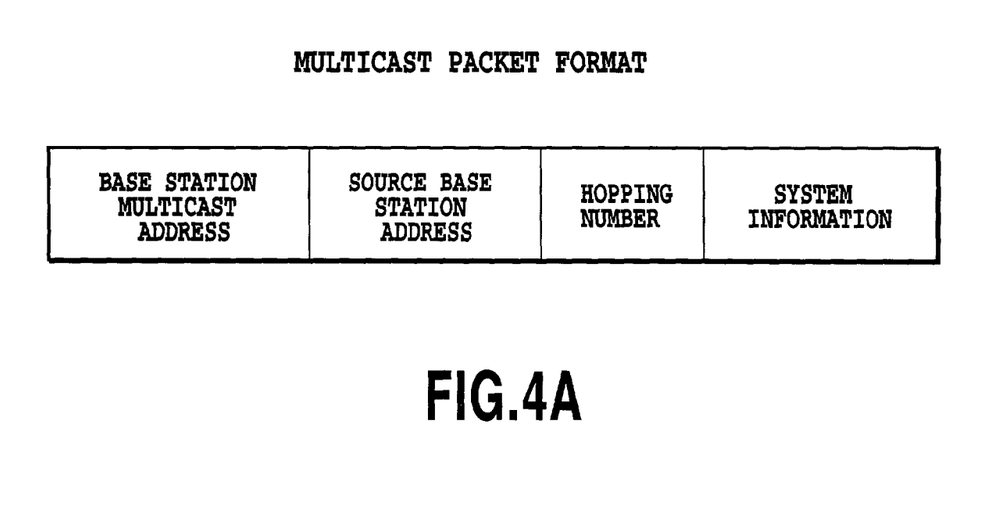
FIG. 4A is a diagram illustrating a multicast packet format in the embodiment 2.
Figure 4B:
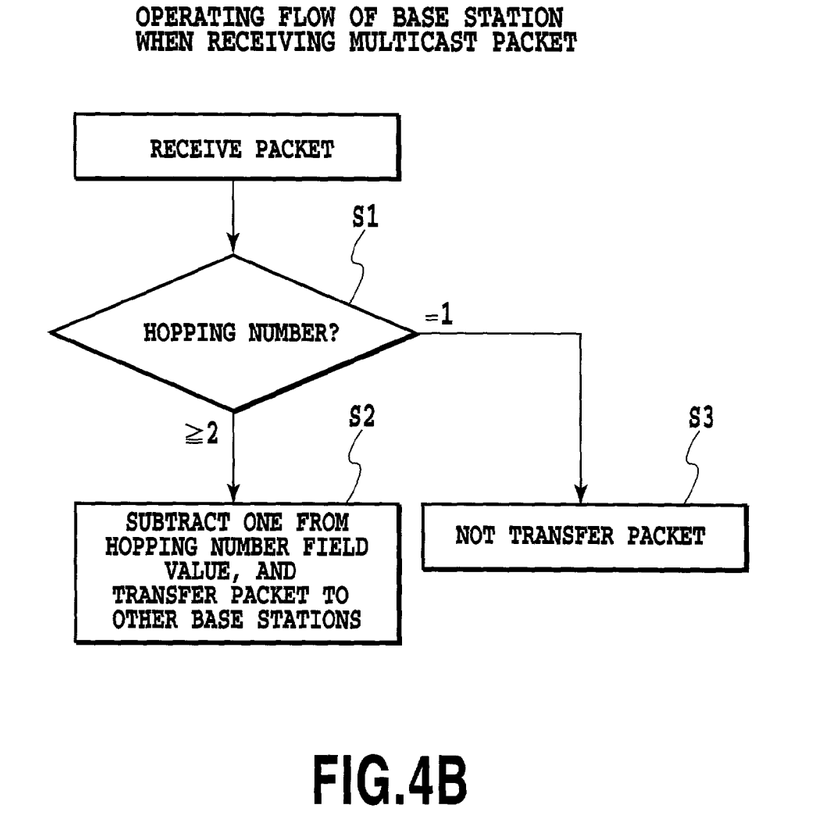
FIG. 4B is a flowchart illustrating the operation when each base station in the embodiment 2 receives a multicast packet.

FIG. 4A shows a format of the multicast packet, and FIG. 4B shows the operating flow at the time when the base station receives the multicast packet. The operation is carried out by the data processing unit in each base station. More specifically, receiving the packet, each base station detects the hopping number field value of the received multicast packet at step S1. When the value is greater than one, it captures the information at step S2, reduces the hopping number field value by one, and transfers it to other base stations. On the other hand, when the hopping number field value of the received packet is one at step S1, although the base station captures the information at step S3, it does not transfer it to other base stations.

To produce the broadcast information, since it is enough for only the base stations close to each other to exchange information, such control is very effective in terms of reducing the traffic of the network.

Each base station generates the broadcast information from its own system information and the system information of other base stations received.

(EMBODIMENT 3)

Figure 5:
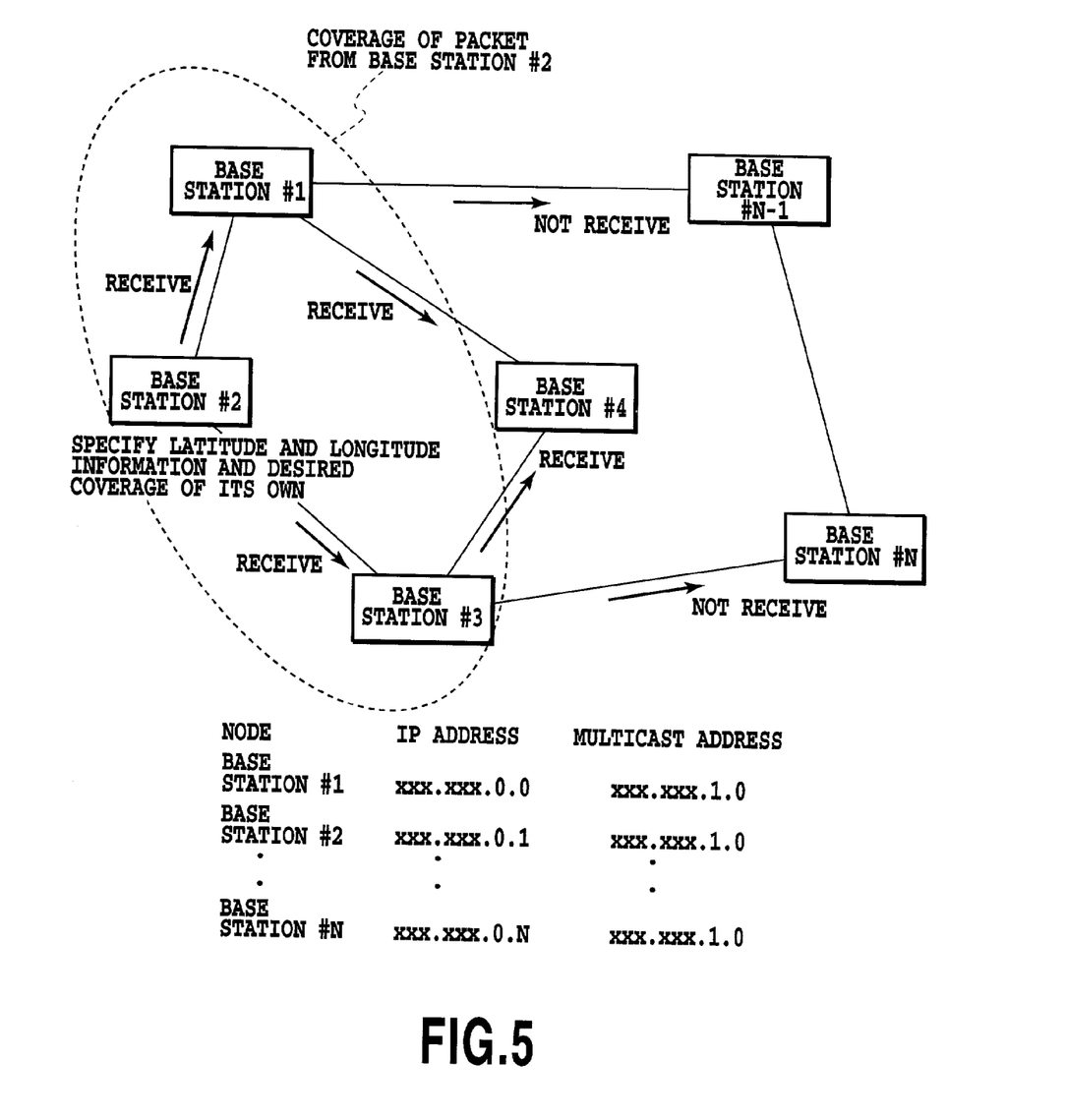
FIG. 5 is a diagram illustrating an embodiment 3 of the mobile communication system in accordance with the present invention.

FIG. 5 is a block diagram showing an embodiment 3 that implements the broadcast information control in accordance with the present invention in the IP network.

In the present embodiment 3, each base station has an IP address and a base station multicast address as in the foregoing embodiment 1.

Each base station sends its own system information using the multicast address. In this case, the transmission packet includes latitude and longitude information about a source base station, so that the coverage of the packet is controlled by a desired packet reception coverage value (Ddesire) that is set at the transmission.

Figure 6A:
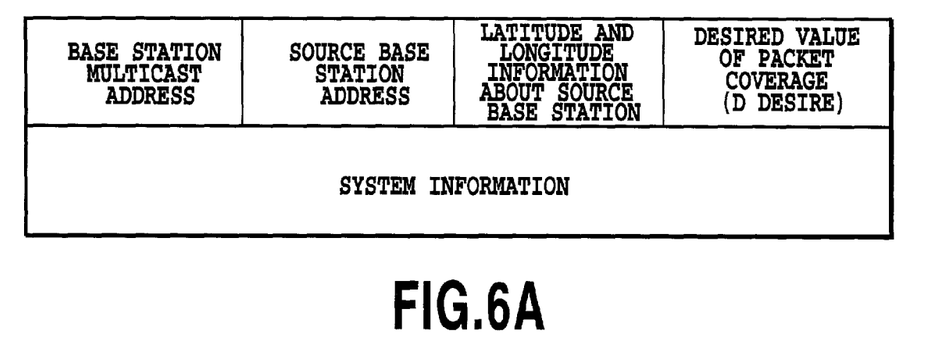
FIG. 6A is a diagram illustrating a multicast packet format in the embodiment 3.
Figure 6B:
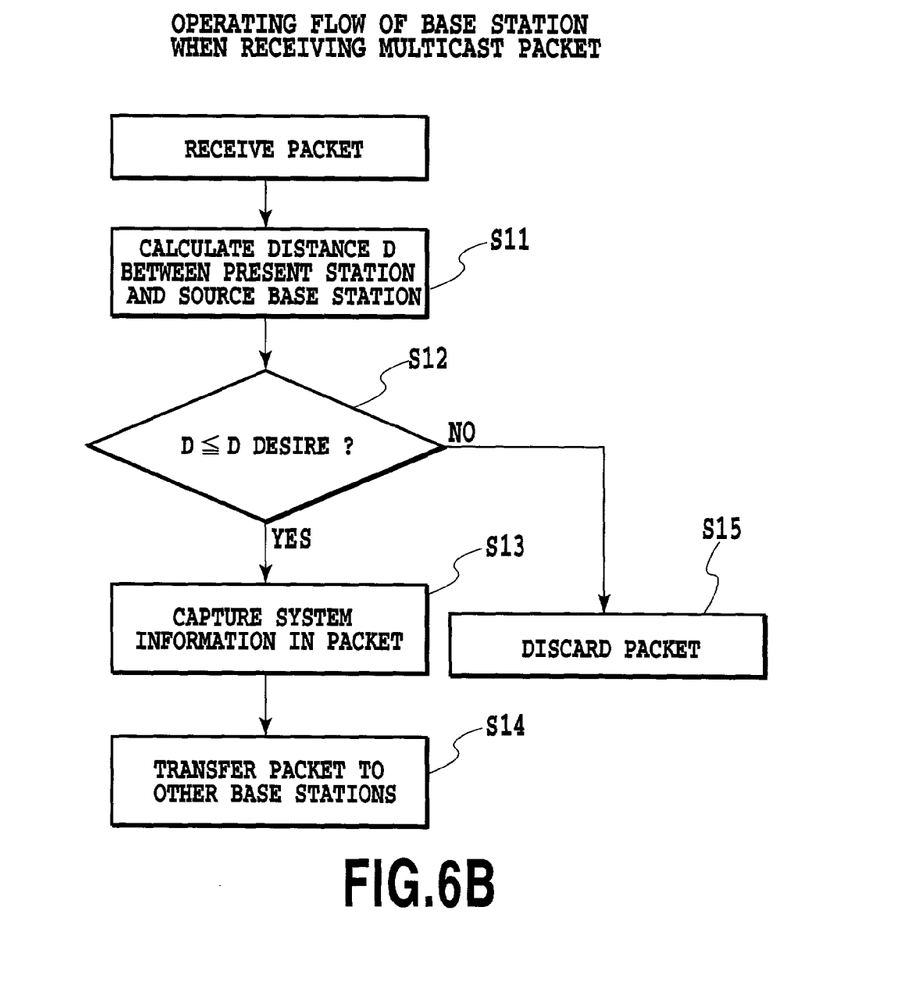
FIG. 6B is a flowchart illustrating the operation when each base station in the embodiment 3 receives a multicast packet.

FIG. 6A shows a format of the multicast packet, and FIG. 6B shows the operating flow at the time when the base station receives the multicast packet. The operation is carried out by the data processing unit in each base station. More specifically, receiving the packet, each base station calculates the distance D between the base station and the source base station from its own latitude and longitude and from the latitude and longitude information about the source base station in the received multicast packet at step S11. At the next step S12, the data processing unit compares the distance D with the desired packet reception coverage value Ddesire. If D≦Ddesire, it captures the information in the packet at step S13, and transfers it to other base stations at step S14. In contrast, if D>Ddesire at step S12, it discards the packet at step S15 without transferring it.

To produce the broadcast information, since it is enough for only the base stations close to each other to some extent to exchange information, such control is very effective for reducing the traffic of the network.

Each base station generates the broadcast information from its own system information and the system information of other base stations received.

(EMBODIMENT 4)

Figure 7:
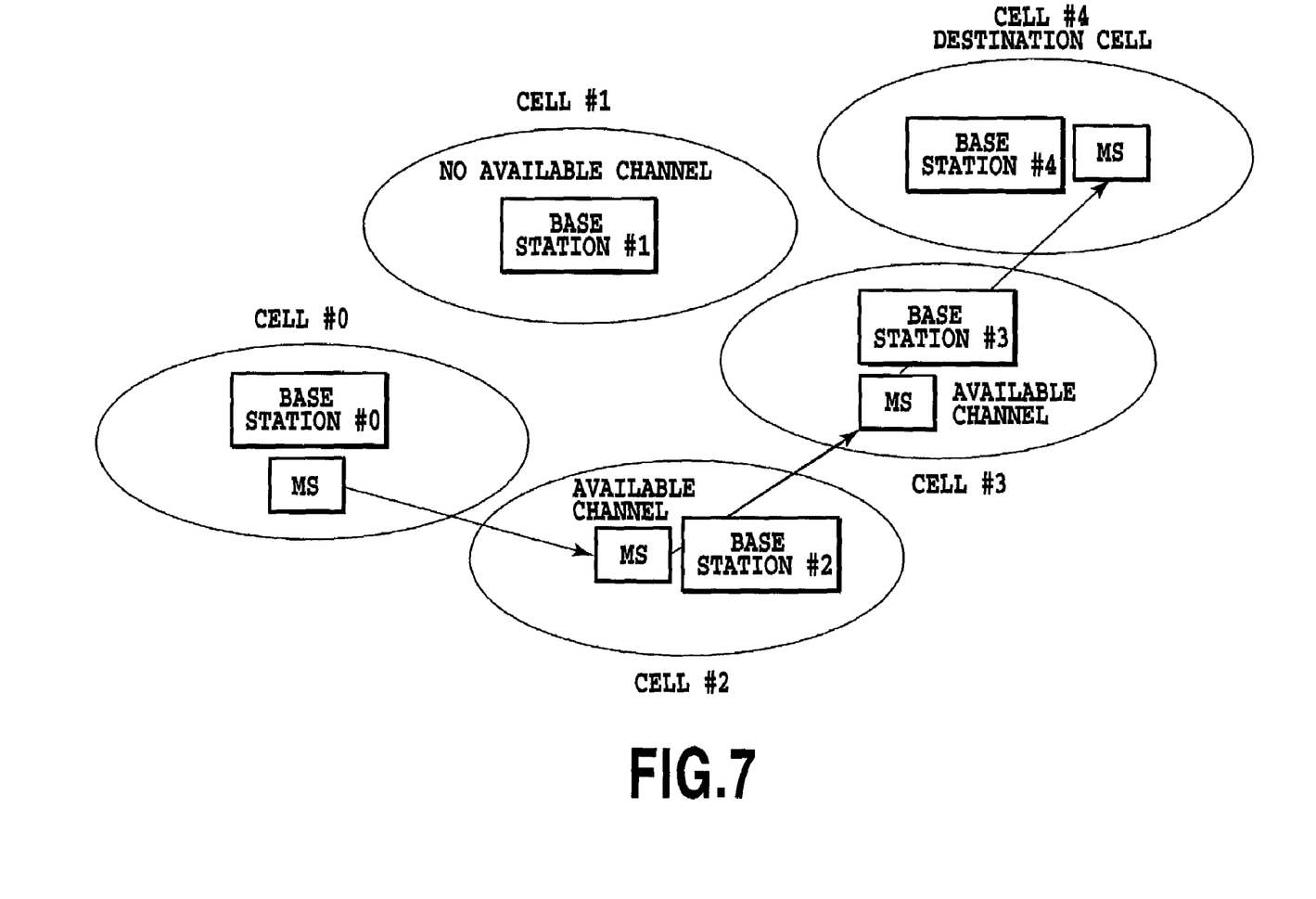
FIG. 7 is a diagram illustrating an embodiment 4 of the mobile communication system in accordance with the present invention.

FIG. 7 is a block diagram showing an embodiment 4 of the broadcast information control in accordance with the present invention.

In the present embodiment 4, a mobile station MS carries out control using the broadcast information of neighboring base stations when it wishes to move to a particular destination with continuing its communication. Here, a description is made assuming that the broadcasting area consists of a single cell.

Figure 8A:
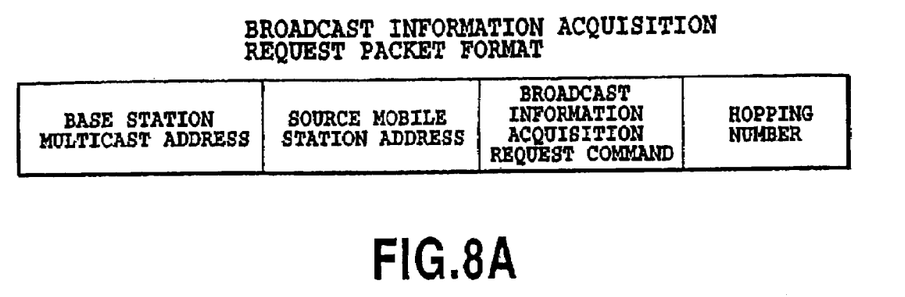
FIG. 8A is a diagram showing a structure of a broadcast information acquisition request packet format.
Figure 8B:
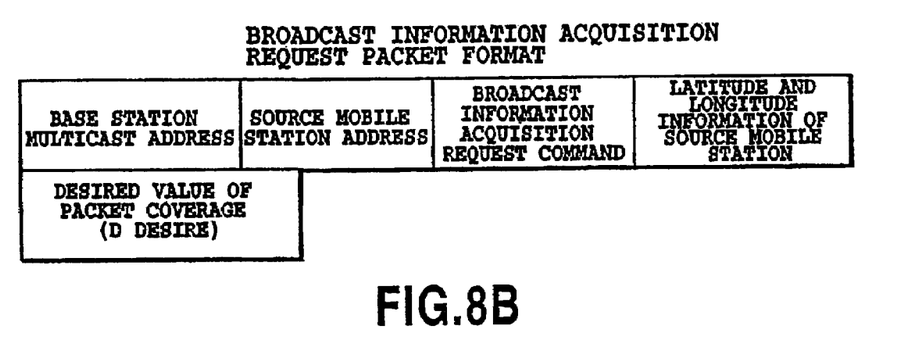
FIG. 8B is a diagram showing another structure of a broadcast information acquisition request packet format.

First, the mobile station MS transmits a broadcast information acquisition request packet using the base station multicast address. In this case, the packet coverage control based on the hopping number or the latitude and longitude information as described in the embodiment 2 or 3 is applicable to the broadcast information acquisition request packet. FIGS. 8(a) and 8(b) each illustrate a format of the broadcast information acquisition request packet when the control is applied.

Figure 8C:
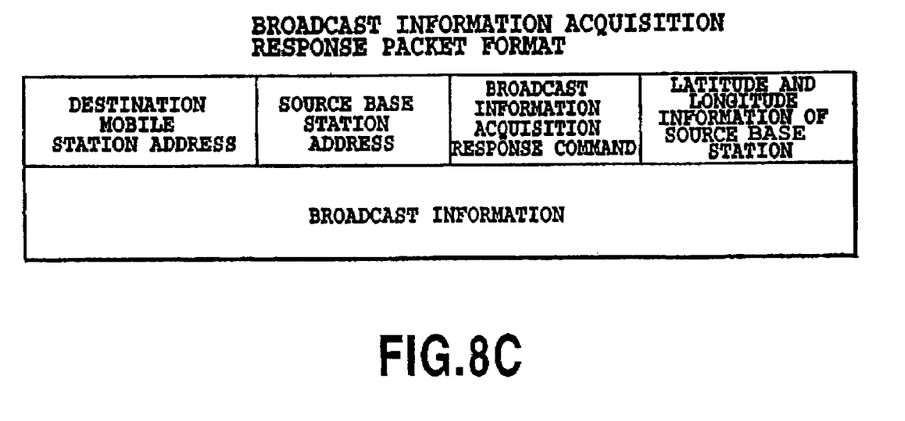
FIG. 8C is a diagram showing a structure of a broadcast information acquisition response packet format.

Receiving the broadcast information acquisition request packet, the base station transmits its own broadcast information to the mobile station MS using the format of the broadcast information acquisition response packet. Here, the broadcast information acquisition response packet includes the latitude and longitude information of the base station that transmits the packet. Thus, the mobile station MS can move to the destination cell with always selecting cells having available channels in accordance with the received broadcast information about individual stations.

According to the present invention, the base stations are two-dimensionally connected to each other, so that the base stations can directly exchange information, and generate broadcast information autonomously in a distributed manner. Thus, the broadcasting control without requiring the RNC can be implemented.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A base station that offers radio communication services in a service area, said base station comprising:

receiving means for receiving information about broadcast information sent from other base station, the broadcast information including controlling information for controlling coverage of its own broadcast information:

broadcast information generating means for generating broadcast information about a broadcasting area of said base station, based upon said received information about the broadcast information:

judging means for judging whether a condition indicated by the controlling information is met or not, based upon said received information about the broadcast information: and transferring means for, when a result of the judgment meets the condition, transferring said received information about broadcast information to base stations other than said other base station which is a source of the information about broadcast information, wherein the controlling information for controlling the coverage of the broadcast information includes a hopping number field value.

2. The base station as claimed in claim 1, further comprising:

means for sending information about broadcast information which is a source and includes controlling information for controlling coverage of its own broadcast information, to other base station using a multicast address.

3. A base station as claimed in claim 1, wherein the base station is in a mobile communication system that includes multiple base stations that are interconnected two-dimensionally and that offer radio communication services in individual service areas, wherein said multiple base stations are two-dimensionally interconnected.

4. The base station as claimed in claim 3, wherein a mobile station comprises means for acquiring broadcast information about an area other than a broadcasting area the mobile station is visiting, from a base station in the broadcasting area the mobile station is visiting.

5. A base station that offers radio communication services in a service area, said base station comprising:

receiving means for receiving information about broadcast information sent from other base station, the broadcast information including controlling information for controlling coverage of its own broadcast information:

broadcast information generating means for generating broadcast information about a broadcasting area of said base station, based upon said received information about the broadcast information:

judging means for judging whether a condition indicated by the controlling information is met or not, based upon said received information about the broadcast information: and transferring means for, when a result of the judgment meets the condition, transferring said received information about broadcast information to base stations other than said other base station, which is a source of the information about broadcast information, wherein the controlling information for controlling the coverage of the broadcast information includes latitude and longitude information of a source base station and its desired reception coverage value.

6. The base station as claimed in claim 5, further comprising:

means for sending information about broadcast information which is a source and includes controlling information for controlling coverage of its own broadcast information, to other base station using a multicast address.

7. A base station as claimed in claim 5, wherein the base station is in a mobile communication system that includes multiple base stations that are interconnected two-dimensionally and that offer radio communication services in individual service areas, wherein said multiple base stations are two-dimensionally interconnected.

8. The base station as claimed in claim 7, wherein a mobile station comprises means for acquiring broadcast information about an area other than a broadcasting area the mobile station is visiting, from a base station in the broadcasting area the mobile station is visiting.

9. A method for controlling broadcast information in a base station that offers radio communication services in a service area, said base station performing the steps of:

receiving information about broadcast information sent from other base station, the broadcast information including controlling information for controlling coverage of its own broadcast information;

generating broadcast information about a broadcasting area of said base station, based upon said received information about the broadcast information;

judging whether a condition indicated by the controlling information is met or not, based upon said received information about the broadcast information; and when a result of the judgment meets the condition, transferring said received information about broadcast information to base stations other than said other base station which is a source of the information about broadcast information, wherein the controlling information for controlling the coverage of the broadcast information includes a hopping number field value.

10. A method for controlling broadcast information in a base station that offers radio communication services in a service area, said base station performing the steps of:

receiving information about broadcast information sent from other base station, the broadcast information including controlling information for controlling coverage of its own broadcast information;

generating broadcast information about a broadcasting area of said base station, based upon said received information about the broadcast information;

judging whether a condition indicated by the controlling information is met or not, based upon said received information about the broadcast information; and when a result of the judgment meets the condition, transferring said received information about broadcast information to base stations other than said other base station which is a source of the information about broadcast information, wherein the controlling information for controlling the transferable coverage of the broadcast information includes latitude and longitude information of a source base station and its desired reception coverage value.

* * * * *